US008779722B2

(12) United States Patent
Lee et al.

(10) Patent No.: US 8,779,722 B2
(45) Date of Patent: Jul. 15, 2014

(54) TWO-STAGE CHARGE EQUALIZATION METHOD AND APPARATUS FOR SERIES-CONNECTED BATTERY STRING

(75) Inventors: Joong Hui Lee, Daejeon (KR); Jae Hwan Lim, Daejeon (KR); Sang Hyun Park, Daejeon (KR); Gun-Woo Moon, Daejeon (KR); Hong Sun Park, Daejeon (KR); Chol-Ho Kim, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 936 days.

(21) Appl. No.: 12/988,901

(22) PCT Filed: Apr. 17, 2009

(86) PCT No.: PCT/KR2009/001998
§ 371 (c)(1),
(2), (4) Date: Jan. 5, 2011

(87) PCT Pub. No.: WO2009/131336
PCT Pub. Date: Oct. 29, 2009

(65) Prior Publication Data
US 2011/0089898 A1 Apr. 21, 2011

(30) Foreign Application Priority Data
Apr. 22, 2008 (KR) .................. 10-2008-0037252

(51) Int. Cl.
*H02J 7/00* (2006.01)
*H02J 7/34* (2006.01)
(52) U.S. Cl.
CPC ........ *H02J 7/34* (2013.01); *H02J 7/0014* (2013.01)
USPC ............ 320/118; 320/116; 320/119; 320/122

(58) Field of Classification Search
CPC ........................................ H02J 7/34
USPC ......... 320/116, 118, 120, 122, 132, 134, 136, 320/162, 166; 324/433, 134, 429; 307/43
See application file for complete search history.

(56) References Cited

U.S. PATENT DOCUMENTS 6,356,055 B1 * 3/2002 Lin et al. ............... 320/116
6,538,414 B1 * 3/2003 Tsuruga et al. ........... 320/119

(Continued)

FOREIGN PATENT DOCUMENTS

JP          4275022 A    9/1992
JP          1032936 A    2/1998

(Continued)

*Primary Examiner* — Edward Tso
*Assistant Examiner* — Alexis Boateng
(74) *Attorney, Agent, or Firm* — The Webb Law Firm

(57) ABSTRACT

A two-stage charge equalization apparatus for a series-connected battery string having a two-stage DC-DC converter including a first DC-DC converter; and a second DC-DC converter which is inputted. A battery string is divided into one or more battery modules having a plurality of battery cells connected in series, and a current conversion switch module forms a path of the charge current between the battery module and the second DC-DC converter to allow the charge current to be applied to the particular battery cell composing the battery module and controls an application direction of the charge current. A microprocessor determines a battery cell to be charged of a low-charged battery cell and controls the current conversion switch module to allow the charge current to be applied to the battery cell to be charged.

18 Claims, 6 Drawing Sheets

(56) References Cited

U.S. PATENT DOCUMENTS

| | | | |
|---|---|---|---|
| 7,193,392 B2 * | 3/2007 | King et al. | 320/118 |
| 8,030,890 B2 * | 10/2011 | Hyatt | 320/114 |
| 2004/0135546 A1 * | 7/2004 | Chertok et al. | 320/118 |
| 2004/0164706 A1 | 8/2004 | Osborne | |
| 2005/0112416 A1 * | 5/2005 | Sakakibara | 429/9 |
| 2005/0242667 A1 | 11/2005 | Emori et al. | |
| 2007/0009770 A1 * | 1/2007 | Takada et al. | 429/9 |
| 2008/0197806 A1 * | 8/2008 | Ridder et al. | 320/119 |

FOREIGN PATENT DOCUMENTS

| | | |
|---|---|---|
| JP | 2000228830 A | 8/2000 |
| JP | 2004194410 A | 7/2004 |
| JP | 2006507790 A | 3/2006 |
| KR | 1020030096978 A | 12/2003 |
| KR | 1020070064244 A | 6/2007 |
| KR | 1020070111587 A | 11/2007 |

\* cited by examiner

TWO-STAGE CHARGE EQUALIZATION METHOD AND APPARATUS FOR SERIES-CONNECTED BATTERY STRING

TECHNICAL FIELD

The present invention relates to a charge equalization apparatus and method for series-connected battery string, and more particularly to a charge equalization apparatus and method which converts a direction of the charging current applied to two-stage DC-DC converter and a battery cell to reduce complexity and volume of a circuit which is to charge the battery cell.

BACKGROUND ART

If a voltage higher than a reference voltage of a unit battery (cell) is needed such as in a hybrid vehicle which uses a lithium ion cell as a power source, it is typical to connect a plurality of unit batteries in series. However, even though the batteries produced via the typical manufacturing method have the same structure using the same anode, cathode and electrolyte, there is existed a difference in charge or discharge characteristics between each battery connected in series.

Therefore, since a voltage difference exists between the unit batteries when using the batteries connected in series, there are problems in that a total voltage (total voltage of batteries connected in series) becomes zero so that a recharge is needed even though one battery is totally discharged irrespective of voltage of the other batteries in the unit batteries connected in series, the battery reaching the certain voltage at first is overcharged due to different voltage between each battery even at the time of the recharge, and the battery which still does not reach any certain voltage exists even though some batteries are overcharged.

Further, if the number of charging/discharging times is higher, significant degradation can occur in materials composing the battery so that characteristics of the battery become different and such degradation is responsible for aggravating the difference between the individual cells.

Therefore, in order to address such problems, various charge equalization apparatuses are actively proposed to achieve charge equalization of the batteries connected in series.

As an example, Korean Patent Laid-Open No. 2003-0096978 is directed to a system which is consisted of a plurality of unit cells, a charging means, a discharging means, and serial-parallel conversion switch, and performs charging by discharging the plurality of unit cells equally and then connecting the discharged unit cells in series using the serial-parallel conversion switch. Korean Patent Laid-Open 2007-0064244 is directed to a system which comprises a cell unit, a field-effect transistor unit connected to the cell unit, an amplifying unit connected to the field-effect transistor unit, a multiplexer controlling an output signal of the amplifying unit, a comparator comparing and determining a variation in a voltage signal of the cell unit, an A/D converting unit converting the output from the comparator into a digital signal, a Micom unit inputted with the signal outputted from the A/D converter and outputting a signal corresponding to the charging/discharging condition, a switching unit supplying the battery equalization current in accordance with the signal of the Micom unit, and a known charging/discharging circuit.

Further, Japanese Patent Laid Open No. 1998-032936 is directed to a system which is consisted of a plurality of unit cells, a detection means for detecting remaining capacity in each unit cell, a charge replacement means and a discharge replacement means for performing charging and discharging in each unit cell, a control means for controlling charging and discharging in each unit cell separately, and a direct current/direct current converter performing charging and discharging separately in each unit cell. Japanese patent Laid Open No. 2004-194410 is directed to a system which is consisted of two or more unit cell groups, a current difference detection means for detecting a difference in currents flowing in each of a first cell group and a second cell group, and a means for controlling charging/discharging current in the cell group based on the difference in currents.

However, since the prior charge equalization apparatus has a charge equalization apparatus provided in each of the batteries connected in series so that charging or discharging is performed separately on each battery, there are problems that complexity and volume of the charge equalization apparatus are increased and thus productivity is reduced and production cost is higher, and components composing the charge equalization apparatus or the switch module for controlling it must endure higher voltage stress.

In order to address such problems, the present applicant have proposed a scheme of the charge equalization control by charging individual battery using two-stage DC-DC converter in Korean Patent Application No. 10-2007-0104033. The charge equalization apparatus using the two-stage DC-DC converter according to the prior patent application is such that each battery module composing the battery string shares the DC-DC converter using a charge control switch in order to reduce the number of DC-DC converters. However, since each battery cell can control a charging current only if the charge control switch must be used for all of a positive direction and a negative direction of the battery whenever the charge control switch is used for each battery cell, the number of the switches typically becomes double the number of batteries. This is considerably disadvantageous in terms of cost and volume of products consisted of multiple battery cells. Therefore, there is a need for method that can reduce the number of charge control switches used to form a charge path of each battery cell.

DISCLOSURE OF INVENTION

Technical Problem

An object of the present invention is to provide a charge equalization apparatus and method which is capable of performing charge equalization efficiently while reducing complexity of the charge equalization apparatus which performs charge equalization in a series-connected battery string, to provide a charge equalization apparatus and method which is capable of using elements having low internal voltage by reducing a voltage stress of the elements used for the purpose of controlling equalization and operation, and to provide a charge equalization apparatus and method which reduces complexity and volume of the circuit for charging an individual battery cell by controlling a path and a direction of the charge current used for charging the individual battery cell.

Technical Solution

To achieve the above objects, the present invention provides a two-stage charge equalization apparatus for a battery string having two or more battery cells connected in series, comprising: a two-stage DC-DC converter including a first DC-DC converter which is inputted with a total voltage of the battery string and outputs a voltage lower than the voltage inputted; and a second DC-DC converter which is inputted with an output of the first DC-DC converter and outputs a charge current for charging a particular battery cell, wherein the battery string is divided into one or more battery modules having a plurality of battery cells connected in series and the second DC-DC converter is provided for each battery module; a current conversion switch module which is provided between the battery module and the second DC-DC converter and forms a path of the charge current and controls an application direction of the charge current to allow the charge current to be applied to the particular battery cell composing the battery module; and a microprocessor which determines a battery cell to be charged of a low-charged battery cell and controls the current conversion switch module to allow the charge current to be applied to the battery cell to be charged.

At this time, the current conversion switch module is provided for each battery module, and the current conversion switch module comprises a current conversion unit and a charge control switch unit which are connected to an output of the second DC-DC converter to control the application direction of the current.

Therefore, the two-stage charge equalization apparatus according to the present invention is provided with the second DC-DC converter for the battery module so that the battery cells belonging to the single battery module share the single second DC-DC converter, two negative/positive outputs of the second DC-DC converter are connected to the current conversion unit and the output of the current conversion unit is connected to the charge control switch unit. The charge control switch unit forms a path through which the charge current flows in the individual battery cell to be charged, and the current conversion unit selectively applies negative or positive output of the second DC-DC converter on the path of the charge current.

Preferably, the charge control switch unit is constructed with charge control switches of the same number as the number of the battery cells composing the battery module and is connected in parallel to each of the battery cells to form the current movement path between the current conversion unit and the battery module. The current conversion unit is connected to two negative/positive outputs of the second DC-DC converter to selectively apply the negative or positive output on the current movement path formed by the charge control switch.

Preferably, the charge control switch is a bidirectional Metal Oxide Semiconductor Field Effect Transistor (MOSFET) switch, and the path of the charge current is formed by controlling a gate voltage of the bidirectional MOSFET composing the charge control switch. The microprocessor controls such that the charge control switch may form the current path of low impedance.

Preferably, Vgs applied upon turning on the MOSFETs composing the bidirectional MOSFET switch is a voltage of two or more series-connected batteries which is one part of the battery module. The two-stage charge equalization apparatus further comprises an electronic relay in a gate of the MOSFET composing the bidirectional MOSFET switch. At this time, the electronic relay comprises a light-emitting diode and a light-receiving element and the light-emitting diode is emitted under the control of the microprocessor which is to control the charge control switch unit.

Subsequently, the light-receiving element is inputted with light outputted from the light-emitting diode and converted to a low-impedance state under the control of the microprocessor and the voltage of two or more batteries connected in series is applied to a gate of the MOSFET composing the bidirectional MOSFET switch as the light-receiving element is converted to the low-impedance state.

The two-stage charge equalization apparatus according to the present invention preferably further comprises a multiplexer which is inputted with a voltage of each battery cell composing the battery string and a voltage sensor which is connected to an output of the multiplexer, and more preferably further comprises an analog to digital converter (ADC) connected to the multiplexer and the voltage sensor. The ADC is responsible for inputting the voltage of the battery cell measured by the microprocessor as a digital value by converting a detection value of the voltage sensor of from the analog output to the digital value.

The multiplexer is controlled by the microprocessor and the voltage of each battery cell composing the battery string measured by the voltage sensor is inputted to the microprocessor.

Preferably, the first DC-DC converter is a DC-DC converter with a negative feedback circuit, which leads to allow the first DC-DC converter to output stable voltage value.

The two-stage charge equalization apparatus further comprises a switch element controlling on/off of each of the first DC-DC converter and the second DC-DC converter, at this time the switch element is controlled by the microprocessor.

Specifically, the switch element is controlled by a PWM signal generated by the microprocessor.

A two-stage charge equalization method for a series-connected battery string according to the present invention will be performed based on the charge equalization apparatus mentioned above.

Specifically, the charge equalization method is performed using the charge equalization apparatus comprising one or more battery module having a plurality of battery cells composing the battery string and connected in series a two-stage DC-DC converter; a first DC-DC converter which is inputted with a total voltage of the battery string and outputs a voltage lower than the voltage inputted; a second DC-DC converter which is inputted with an output of the first DC-DC converter and outputs a charge current for charging a particular battery cell; a current conversion switch module which forms a path of the charge current between the battery module and the second DC-DC converter to allow the charge current to be applied to the particular battery cell composing the battery module and controls an application direction of the charge current; a multiplexer which is inputted with a voltage of each battery cell composing the battery string; a voltage sensor which is connected to an output of the multiplexer to measure the voltage of each battery cell; and a microprocessor which determines a battery cell to be charged of a low-charged battery cell, controls the current conversion switch module to allow the charge current to be applied to the battery cell to be charged and controls on/off operation of the first DC/DC converter and the second DC/DC.

The two-stage charge equalization method for a series-connected battery string according to the present invention comprises steps of (a) determining whether to perform charge equalization of the battery string based on a voltage difference obtained by measuring a voltage of each battery cell composing the battery string; (b) selecting a low charged battery cell based on the voltage measured upon performing the charge equalization of the battery string; (c) controlling directions of two negative and positive outputs of the second DC-DC converter to connect the low-charged battery cell and the two outputs of the second DC-DC converter in parallel; (d) operating the second DC-DC converter; and (e) charging the low-charge battery cell by operating the first DC-DC converter.

Preferably, the step (a) is performed such that a voltage value of each battery cell composing the battery string obtained via the voltage sensor is inputted to the microprocessor by controlling the multiplexer, and charge equalization of the battery string is preferably performed if a difference in measurement voltage of the battery cell is higher than the certain value.

In the step (b), the microprocessor determines the battery cell on which charge equalization of the battery string according to the present invention is performed, and preferably determines the low-charged battery cell as the battery cell to be charged.

The step (c) controls such that two negative or positive outputs of the second DC-DC converter are selectively applied on the low-charged battery cell of a battery cell to be charged and the current movement path is formed between the low-charged battery cell and the two outputs of the second DC-DC converter.

Specifically, the charge control switch unit composing the current conversion switch module is controlled by the microprocessor to form a path of a low impedance through which two negative and positive outputs of the second DC-DC converter are applied and the current conversion unit composing the current conversion switch module is controlled such that the negative output of the second DC-DC converter is applied to the path of low impedance formed on a cathode of the low-charged battery cell and the positive output of the second DC-DC converter is applied to the path of low impedance formed on an anode of the low-charged battery cell. The current conversion switch module including the current conversion unit and the charge control switch unit is controlled by the microprocessor to set the current path and the application direction of the current so that the charge current outputted from the second DC/DC converter flows in the low-charged cell which is a battery cell to be charged.

The step (e) performs controlling such that the first DC-DC converter is interrupted (off) and a magnetic energy stored in the first DC-DC converter is moved to the second DC-DC converter to cause the second DC-DC converter to be operated (on) at a certain duty ratio.

Specifically, if the low-charged battery cell which is a battery cell to be charged is determined by the microprocessor, the current conversion switch module is inputted with a control signal of the microprocessor to set the current path between the low-charged battery cell and the second DC-DC converter and set the application direction of the current, and then the second DC-DC converter and the first DC-DC converter are successively operated (on) by the microprocessor. The first DC-DC converter is interrupted (off) and the magnetic energy stored on the first DC-DC converter is moved to the second DC-DC converter. At this time, the second DC-DC converter is inputted with a PWM signal generated by the microprocessor and operated (on) at a certain duty ratio to output the charge current. Such charge current flows in the low-charged battery cell to charge the battery cell in accordance with the current path formed by the current conversion switch module and the current application direction.

The first DC-DC converter is inputted with a total voltage of battery string and output the voltage lower than the inputted voltage and the input of the second DC-DC converter is connected in parallel to the output of the first DC-DC converter so that the low-charged battery cell is charged by the voltage of the total battery string inputted from the first DC-DC converter.

The charge equalization method can be accomplished such that the step (a) measures the voltage of each of all batteries composing the battery string and the steps (b) to (e) are performed independently of one another for each battery module composing the battery string and consisted of a plurality of battery cells connected in series. Therefore, the low-charged battery cell can be selected independently of one another for each battery module, and the low-charged battery cells selected for each battery module are charged independently of one another by the charge current of individual second DC-DC converter provided for each battery module. At this time, the current conversion switch module is provided for each battery module between the battery module and the second DC-DC converter and the current conversion switch module is controlled independently of one another for each module by the microprocessor.

Advantageous Effects

The two-stage charge equalization apparatus and method according to the present invention can achieve efficient charge equalization while reducing complexity of the charge equalization apparatus by dividing total batteries into modules and sharing the DC-DC converter between each battery module, and reduce the voltage stress in the DC-DC converter and the control switch considerably since it is constructed with two-stage DC-DC converter having an input of the DC-DC converter (second stage DC-DC converter) and an output of the single DC-DC converter (first stage DC-DC converter) connected in parallel and the single DC-DC converter (first stage DC-DC converter) outputs lower voltage than the voltage of total battery string. Further, the present invention has the same charging efficiency as that of prior art in which the charge circuit is provided for each battery, by connecting the DC-DC converter shared between each battery module to the individual battery in parallel. Further, the present invention has an advantage in that complexity and volume of the circuit for charging the individual battery cell can be reduced by controlling a path and a direction of the charge current used for charging the individual battery cell.

BRIEF DESCRIPTION OF DRAWINGS

The above and other objects, features and advantages of the present invention will become apparent from the following description of preferred embodiments given in conjunction with the accompanying drawings, in which.

BEST MODE FOR CARRYING OUT THE INVENTION

Figure 1:
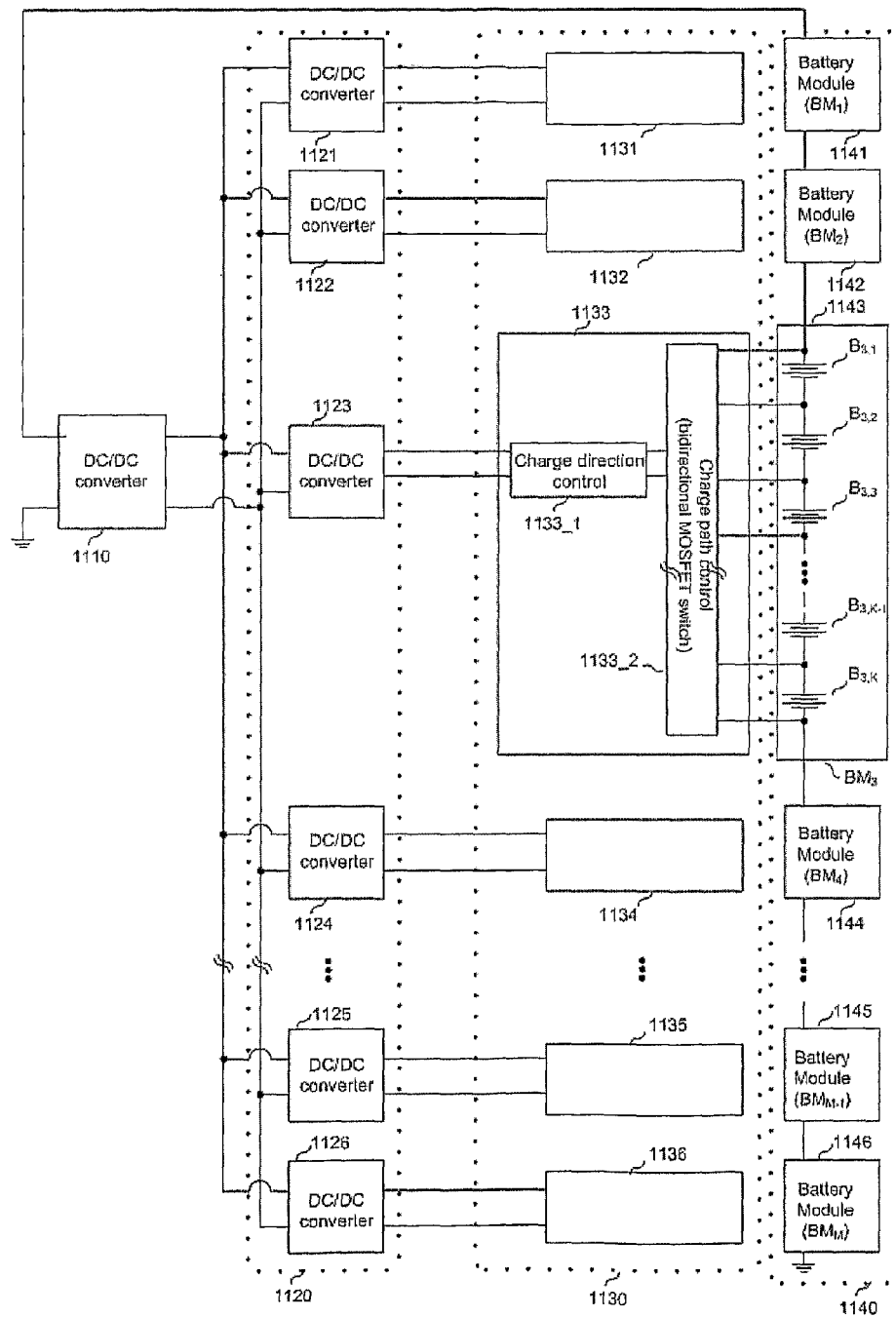
FIG. 1 is one structure diagram of a two-stage charge equalization apparatus according to the present invention.

Hereinafter, a charge equalization apparatus and method according to the present invention will be described in detail with reference to accompanying drawings. The accompanying drawings are provided as an example sufficiently to deliver an idea of the present invention to the person skilled in the art. Therefore, the present invention is not bounded by the drawings presented hereinafter but can be specified in another form. Further, like reference numerals denote like element throughout the following detailed description of the invention.

At this time, if the technological terms and science terms used herein do not have any other definition, they have meanings that can be typically understood by the person skilled in the art. Further, known functions and structures which can unnecessary make obscure the subject matter of the present invention in the following description and accompanying drawings will be omitted.

In order to make clear the description of the present invention upon describing a structure and characteristic of it, a total string of series-connected battery is commonly referred to battery string, one portion of the battery string having a plurality of batteries connected in series is commonly referred to a battery module, and any single battery composing the single battery module is commonly referred to a battery cell.

FIG. 1 shows one example of a charge equalization apparatus according to the present invention. A major characteristic of the present invention will be described referring to FIG. 1.

As shown in FIG. 1, a battery string 1140 is divided into M (M≥2) battery modules 1141 to 1146 having K (K≥2) battery cells connected in series. Each battery module has K battery cells connected in series such as in a third battery module $BM_3$ 1143, and the third battery module $BM_3$ is composed of battery cells $B_{3,1}$ to $B_{3,K}$. Though it is shown that all battery modules are composed of the same number of battery cells in FIG. 1, the individual battery module may be consisted with battery cells of the number different from each other.

Each of M battery modules 1141 to 1146 dividing the battery string 1140 into each module is connected to current conversion switch modules 1131 to 1136, and each of M current conversion switch modules 1131 to 1136 is connected to DC-DC converters 1121 to 1126 composing a second stage DC-DC converter 1120. Therefore, M battery modules are equipped with M current conversion switch modules and M DC-DC converters. All inputs of the second stage DC-DC converter 1120 are connected to an output of the first stage DC-DC converter 1110 in parallel as shown in FIG. 1. Differently from the DC-DC converter 1120 composing the second stage, the DC-DC converter 1110 composing the first stage is composed of the single DC-DC converter 1110 having total voltage of the battery string connected as an input. As shown in FIG. 1, the charge equalization apparatus according to the present invention is structured such that the battery string is divided into the battery modules to cause each battery module to share the second stage DC-DC converter, and the input of the second stage DC-DC converter is connected in parallel to the output of the first stage DC-DC converter and the first stage DC-DC converter has total voltage of the battery string as the input.

The current conversion switch modules 1130, 1131 to 1136 are composed of a charge control switch unit 1133_2 and a current conversion unit 1133_1, in which the charge control switch unit 1133_2 provides a current path which is to apply the charge current which is an output of the second stage DC-DC converter to a particular battery cell (a battery cell to be charged) and the current conversion unit 1133_1 controls a direction of the charge current flowing in a current path formed by the charge control switch unit 1133_2. Specifically, when performing the charge equalization on the battery cell $B_{3,3}$ taking the battery cells $B_{3,1}$ to $B_{3,K}$ belonging to the third battery module $BM_3$ as an example, a current movement path (low impedance) between the corresponding battery cell $B_{3,3}$ and an output of the DC-DC converter 1123 belonging to the second stage, i.e., the corresponding battery cell $B_{3,3}$ and the current conversion unit 1133_1 is provided by the charge control switch 1133_1 and the charge current (an output of the two-stage DC-DC converter 1123) of which current flow direction is controlled by the current conversion unit 1133_1 flows on the current movement path formed by the charge control switch unit 1133_1. The charge current (an output of the second stage DC-DC converter 1123) is caused due to a total voltage of the battery string connected to the first stage DC-DC converter 110 and thus charge equalization is performed on the battery cell $B_{3,3}$ using the total voltage of battery string.

At this time, the first stage DC-DC converter 1110 is preferably a DC-DC converter outputting a voltage lower than the voltage input. Due to a structure of the two-stage DC-DC converter having the output of the first stage DC-DC converter 1110 and the input of the second stage DC-DC converter 1120 connected in parallel and the charge equalization in a concept of the battery module not the battery string, it is possible to structure the switch element composing the current conversion switch module 1130 using low voltage bidirectional switch element or low voltage unidirectional switch element, and to reduce the voltage stress in the second stage DC-DC converter and the number of DC-DC converters used for the charge equalization.

Further, since the current conversion switch module 1130 is composed of a charge control switch unit 1133_2 and a current conversion unit 1133_1, the number of the charge control switch units 1133_2 which control the current movement path between an output of the second stage DC-DC converter 1120 and the battery cell to be charged may be reduced to a half.

The first stage DC-DC converter 1110 is responsible for generating low output voltage by using total voltage of the battery string as an input and the second stage DC-DC converter 1120 is responsible for charging actually low-charged battery cell by using an output of the first stage DC-DC converter 1110 as an input. Further, the movement path and an application direction of the charge current between the low charged battery cell and the output of the second stage DC-DC converter 1120 are controlled and formed via the current conversion switch module 1130.

Specifically, the two-stage charge equalization apparatus according to the present invention performs charge equalization by controlling charge in the battery cell in order to overcome the voltage difference between batteries which can be caused when charging or discharging the batteries in the battery string. At this time, it is possible to perform the charge equalization between the batteries while reducing total energy consumption by handing over the total battery energy into the battery cell having the voltage which is relatively low, in order to control the battery cell individually and input the charge into the battery efficiently. Further, in order to minimize the number of circuits included in each battery cell when connecting the plurality of batteries in series, the control device directly connected to the battery string uses a common DC-DC converter in order to transfer the charge energy into the battery efficiently in a comparatively simple structure. Further, the charge equalization is performed by collecting the certain number of batteries as each module to use the common DC-DC converter between the battery modules, and inputting the charge outputted from the DC-DC converter (second stage DC-DC converter) between the modules to the battery cell to be charged via the current conversion switch module which selectively forms the current flow path and controls the current flow direction via a simple switch control.

As mentioned earlier, the two-stage charge equalization apparatus according to the present invention can control an amount of charge inputted to the battery cell while reducing its complexity, cost and volume by connecting the current conversion switch module to each battery cell while using the single DC-DC converter in common without using individual circuit for each battery cell which leads to increasing complexity.

Figure 2:
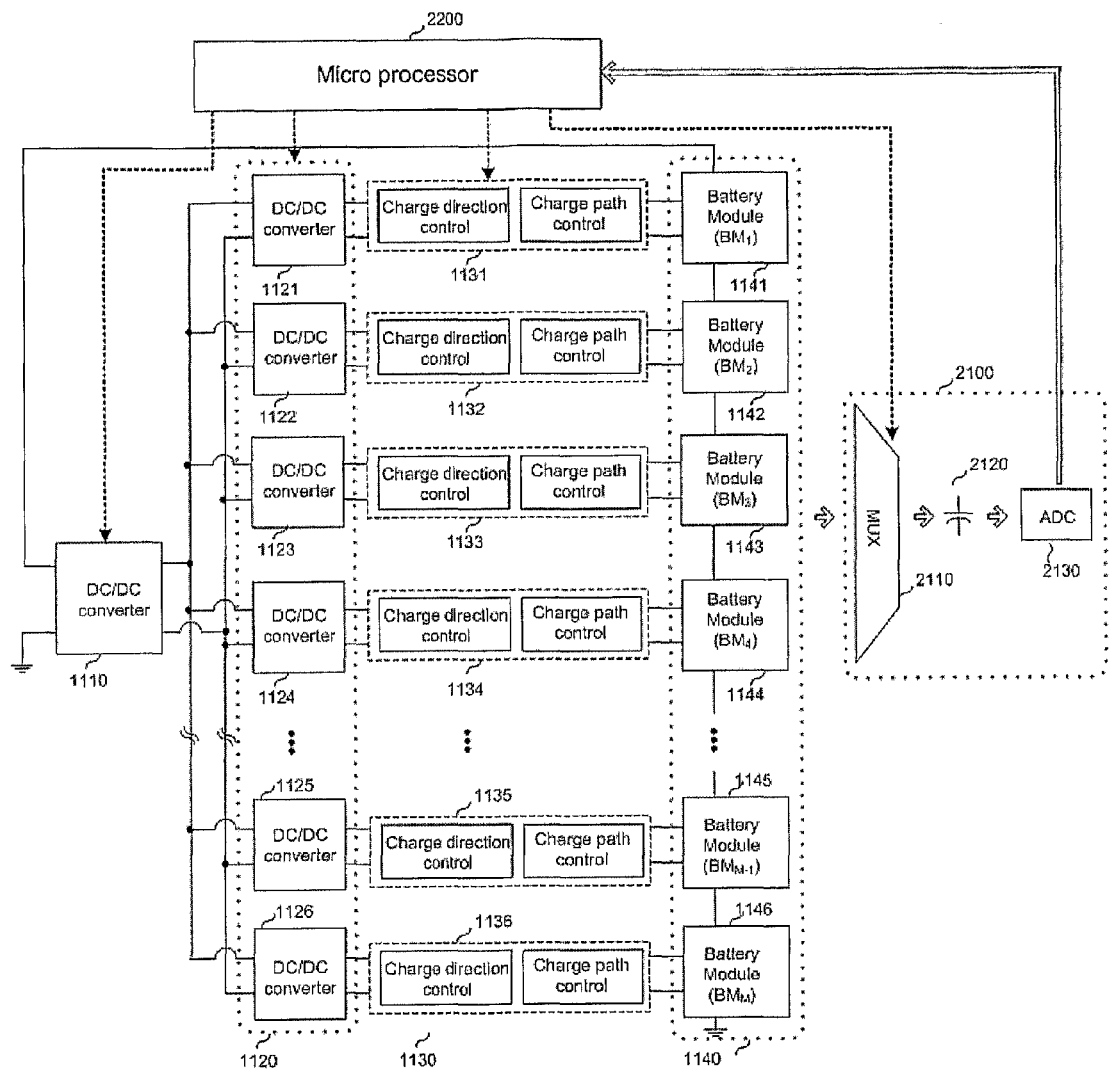
FIG. 2 is another structure diagram of a two-stage charge equalization apparatus according to the present invention.

FIG. 2 is a preferable structure diagram of a two-stage charge equalization apparatus above-mentioned based on FIG. 1 according to the present invention. Referring to FIG. 2, it will be specifically described on a method for controlling the charge equalization apparatus according to the present invention. The elements 1110 to 1140 are structured similarly as FIG. 1. Though a voltage sensing module 2100 measuring a voltage of the individual battery cell may be used with a typical voltage sensing module, and it is preferably consisted of a multiplexer MUX 2110 taking a voltage of the individual battery cell composing the battery string as an input and a capacitor 2120 connected with an output of the multiplexer. The voltage of the individual battery cell measured via the capacitor 2120 is preferably converted to the digital value via an analog-digital converter ADC 1230 and input to a microprocessor 2200.

It is preferable that the DC-DC converter 1110 in the first stage and each DC-DC converters 1121 to 1126 for each module in the second stage are equipped with main switch respectively, and the main switch is responsible for on/off of each DC-DC converter 1110, 1121 to 1126 and controlled by a PWM signal generated by the microprocessor 2220 or a control chip (not shown) dedicated to PWM. When using the PWM signal generated by the microprocessor, it is constrained to drive the power switch due to limited current capacity of the PWM signal generated by the microprocessor, and therefore it is preferable to be provided with an additional circuit.

The charge equalization is carried out on the low-charged battery cell by allowing the microprocessor 2200 to measure the voltage of the individual battery under the control of the multiplexer 2110, determine low-charged battery cell based on the voltage of the individual battery and control the switch module 1130, the main switch of each DC-DC converter 1121 to 1126 for each module in the second stage and the main switch of the first stage DC-DC converter 1110. It is preferable that the charge equalization is carried out by causing the current conversion switch module 1130, the main switch of each DC-DC converter 1121 to 1126 for each module in the second stage, and the main switch of DC-DC converter 1110 in the first stage to be controlled in this order. The current conversion switch module 1130 is consisted of a current conversion unit (a charge direction control unit in FIG. 2) which controls a flow direction of the current outputted from each DC-DC converter 1121 to 1126 for each module in the second stage and a charge control switch unit (a charge path control unit in FIG. 2) which selectively forms a flow path of the current to allow the current of which flow direction is controlled by the current conversion unit to be applied to the individual battery cell.

Figure 3:
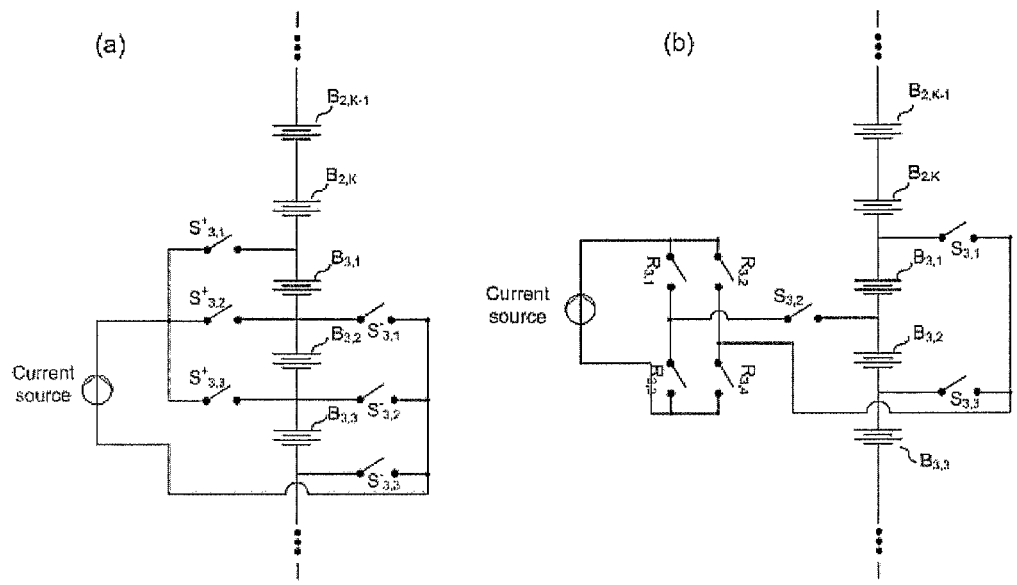
FIG. 3(a) is a structure diagram of prior switch module and FIG. 3(b) is a partial circuit diagram of a current conversion switch module according to the present invention.

FIG. 3(a) shows a structure diagram of prior switch module in which the current movement path is formed using the switch element to cause the charge current outputted from the second stage DC-DC converter to be flowed in the battery cell to be charged; and FIG. 3(b) is a circuit diagram in which the current conversion unit and the charge control switch unit are provided to allow the flow direction of the charge current to be controlled and the current movement path to be formed according to the present invention. The charge current outputted form the second stage DC-DC converter is shown as a current source in FIG. 3.

If the flow direction of the charge current is not controlled as shown in FIG. 3(a), a negative switch element (S$_D$) and a positive switch element (S+) are provided respectively for each individual battery cell so that the switch elements of double the total number of battery cells must be provided. However, if the flow direction of the charge current is controlled using the switch element R as shown in FIG. 3(b), the single switch element which can provide a path of low impedance for each individual battery cell is provided. Consequently, if the current conversion unit is provided to control the flow direction of the current, the charge control switch unit can be structured with the switch elements of the same number as total number of the battery cells. The current conversion unit is structured such that it may be inputted with the charge current outputted from the second stage DC-DC converter and output the charge current selectively to a first output line or a second output line of the current conversion unit under the control of the microprocessor. The current conversion unit can be structured with the switch elements $R_{3,1}$ to $R_{3,4}$ as shown in FIG. 3, even though it is not limited by a kind of the individual element composing the current conversion.

Figure 4:
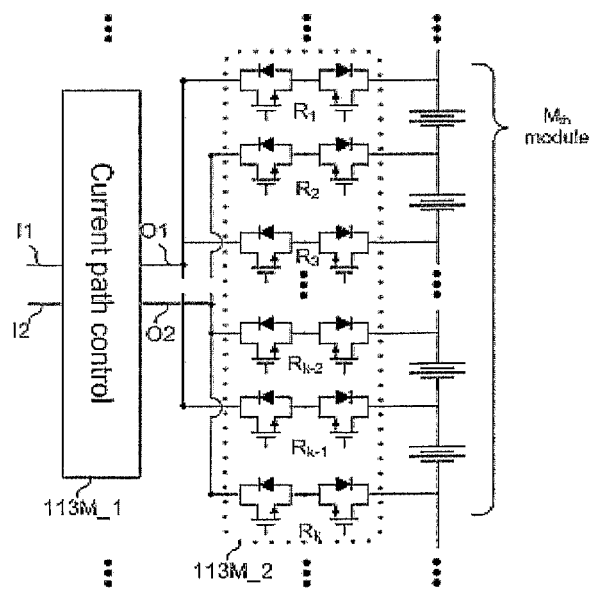
FIG. 4 is a partial circuit diagram of a current conversion switch module provided in the Mth battery module.

FIG. 4 shows an example showing current conversion switch modules 113M_1 and 113M_2 provided in the Mth battery module according to the present invention. The current conversion switch module according to the present invention is provided for each corresponding battery module and all current conversion switch modules are controlled for each battery module by the microprocessor. As described above, the current conversion switch module is configured with the current conversion unit 113M_1 and the charge control switch unit 113M_2, in which the current conversion unit 113M_1 takes two outputs +, $_D$ of Mth DC-DC converter which Mth battery module shares as inputs I1, I2. The current conversion unit 113M_1 outputs the charge current to the first output line 01 or the second output line 02 under the control of the microprocessor. Specifically, the positive input of two outputs of the DC-DC converter is output to the first output line 01 or the second output line 02, i.e., the negative input of two outputs of the DC-DC converter is output to remaining output line (first output line 01 or second output line 02) to which the positive input is not output. The charge control switch unit 113M_2 has the switch elements $R_1$ to $R_k$ provided respectively in parallel between an end portion of the battery module and the battery cell, in which the switch element is preferably bidirectional MOSFET element. One side of the switch elements $R_1$ to $R_k$ is connected in parallel to the battery cell composing the battery module and the other side of the switch elements $R_1$ to $R_k$ is connected to the first output line 01 or the second output line 02. At this time, each of the switch elements $R_1$ to $R_k$ composing the charge control switch unit 113M_2 is consecutively connected alternately to the first output line 01 or the second output line 02 as shown in FIG. 4.

Figure 5:
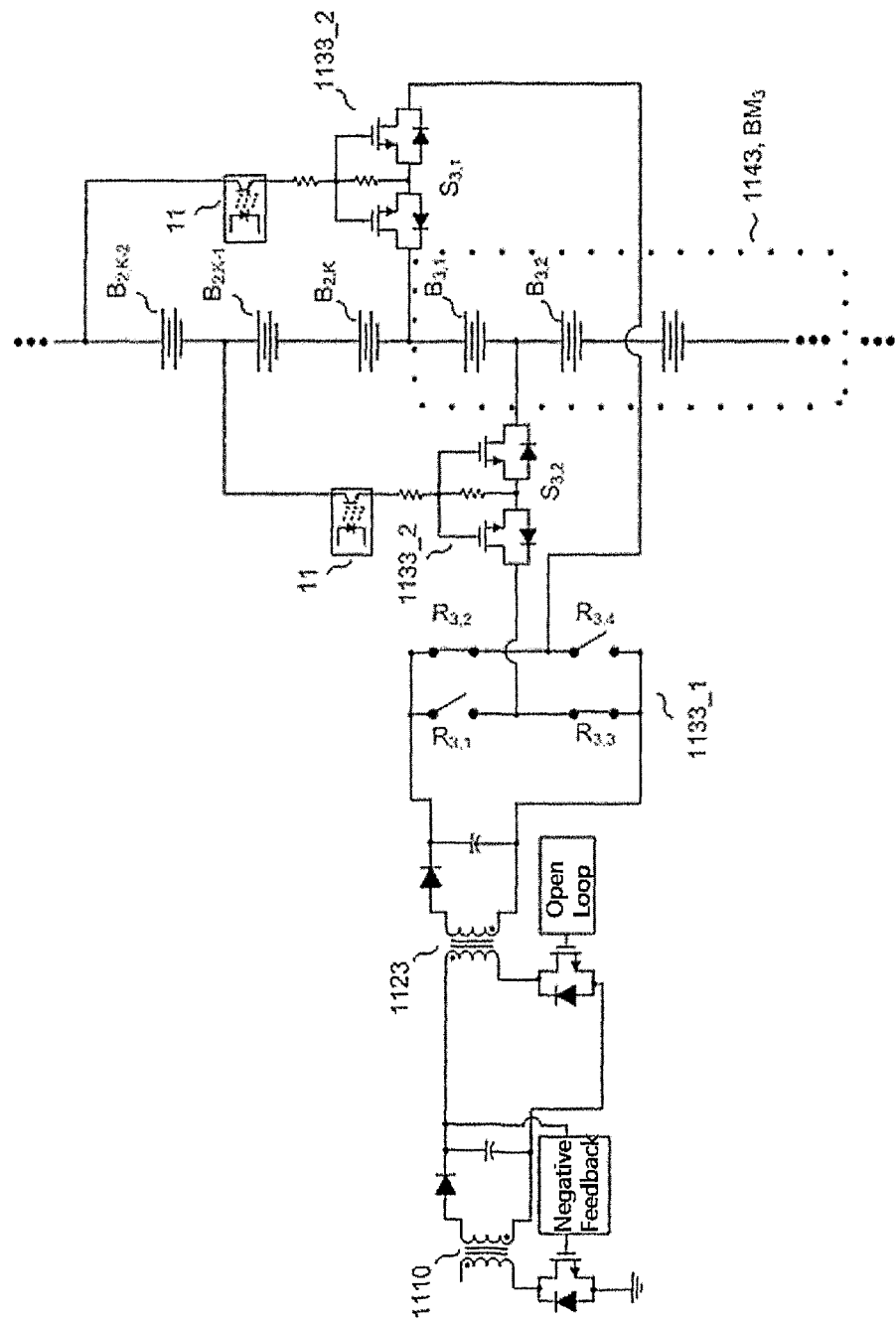
FIG. 5 is a partial circuit diagram of a two-stage charge equalization apparatus according to the present invention as a basis of a battery cell to be charged.

FIG. 5 shows partial circuit diagram of a two-stage charge equalization apparatus according to the present invention as a basis of a first battery cell $B_{3,1}$ of a third battery module $BM_3$ 1143.

As mentioned above, the first stage DC-DC converter 1110 is preferably a DC-DC converter having a negative feedback circuit and the second stage DC-DC converter 1123 is connected to the third battery module 1143, $BM_3$ via the current conversion switch module. The current conversion switch module is configured with a current conversion unit 1133_1 and a charge control switch unit 1133_2. FIG. 5 shows a case in which the first battery cell $B_{3,1}$ of the third battery module $BM_3$ 1143 is the battery cell to be charged. For the purpose of clear understanding, only part of the current conversion unit 1133_1 and the charge control switch unit 1133_2 related to the battery cell $B_{3,1}$ to be charged is shown.

Since the charge control switch unit 1133_2 is structured with a low voltage, bidirectional charge control switch element to allow it to be operated in accordance with on/off signal of the microprocessor, an electronic relay 11 is connected to the input (gate) of the charge control switch to cause the on/off signal.

The electronic relay 11 may be a solid state relay or an optocoupler and is preferably consisted of a light-emitting diode and a Bipolar Junction Transistor (BJT) of a light-receiving element. The BJT is placed in a low impedance state (turn-on state) by receiving the light of the light-emitting diode, so that the voltage of two or more batteries connected in series is applied to a gate of a MOSFET composing the switch element.

Specifically, the light-emitting diode is emitted under the control of the Microprocessor 2220 for controlling the charge control switch unit 1133_2 and the BJT is turned on due to an emission of the light-emitting diode to allow the turn-on voltage to be applied to the gate of the MOSFET composing the charge control switch. At this time, Vgs (Vgs is a gate voltage taking a source voltage of MOSFET as a basis) is a voltage of the two or more batteries connected in series to turn on the MOSFET composing the charge control switch unit 1133_2 as shown in FIG. 5. In a case of FIG. 5, the voltage of 3 batteries connected in series becomes Vgs which is applied upon turning on the MOSFET. In order to control the gate voltage and the drain voltage, a resistor can be provided in the gate voltage application path and the drain voltage application path, as shown in FIG. 5. The one part of the voltage in the battery module is used as a power source which is to drive each of the MOSFET switches composing the charge control switch unit 1133_2.

The current convert unit 1133_1 is consisted of bidirectional or unidirectional element and is connected to two outputs (+, D) of the second stage DC-DC converter 1123. At this time, as shown in FIG. 5, the light-emitting diode of the electronic relay 11 is emitted under the control of the Microprocessor in order to charge the first battery cell $B_{3,1}$ in the third battery module $BM_3$ 1143 and subsequently the bidirectional MOSFET switches $S_{3,1}$, $S_{3,2}$ connected in parallel to both terminals of the first battery cell $B_{3,1}$ are turned on and the current movement path is formed between the current conversion unit 1133_1 and the first battery cell $B_{3,1}$. The microprocessor controls the switch composing the current conversion unit 1133_1 to control the direction of the charge current applied to two current movement paths (denoting channels of the turned-on bidirectional MOSFET switch as $S_{3,1}$, $S_{3,2}$) formed by the charge control switch unit 1133_2. The Microprocessor controls the direction of the charge current to cause a positive output of the DC-DC converter 1123 to be applied to the current movement path $S_{3,1}$ and a negative output of the DC-DC converter 1123 to be applied to the current movement path $S_{3,2}$, by turning on the switch $R_{3,2}$ and the switch $R_{3,3}$ composing the current conversion unit 1133_1. Subsequently, the charge current outputted from the second stage DC-DC converter 1123 flows in the first battery cell $B_{3,1}$ so that the first battery cell $B_{3,1}$ of low-charged cell is charged.

As shown in FIG. 5, if the low-charged battery cell $B_{3,2}$ is determined by the microprocessor, the current conversion switch module is controlled under the control of the microprocessor so that the current movement path and the current application direction are controlled and formed to cause the charge current to be applied to the low-charged battery cell $B_{3,2}$. After the current conversion switch module is controlled by the microprocessor, if the DC-DC converter 1123 of the battery module $BM_3$ 1143 to which the battery cell belongs is turned on and a main switch of the first stage DC-DC converter 1110 is turned on, the current is induced due to the voltage of total batteries in a primary winding of a first stage transformer and thus a magnetic energy of the same amount is stored in the transformer. Subsequently, if the main switch of the first stage DC-DC converter is turned off, the magnetic energy stored in the transformer moves to the second stage DC-DC converter 1123 through a secondary winding and a diode. At this time, it is preferable that the output voltage of the DC-DC converter in the first stage must be remained in a uniform voltage via the negative feedback circuit since it is used as an input of the DC-DC converter 1123 in the next second stage. The second stage DC-DC converter 1123 passes the primary side energy of the transformer stored at the turn-on of the switch to the secondary side when the switch is turned off, by means of the switch operation having a fixed duty ratio, in which the energy passed to the secondary side is moved to particular battery cell in accordance with the current movement path controlled in a direction controlled by the current conversion switch module, whereby the charge can be supplied to the desired battery cell.

Since the idea of the present invention can be implemented irrespective of a kind of DC-DC converter used, the two-stage charge equalization apparatus according to the present invention can be configured in combination of various kinds of existing DC-DC converters. For example, the DC-DC converter used in the first stage can be used with the same kind of DC-DC converter as the second stage DC-DC converter, and also can be used with other kind of DC-DC converter. The total voltage of the battery string is delivered by the common DC-DC converter in the first stage at one time and an input voltage of the DC-DC converter for each battery module connected in the next stage must be lower than the voltage outputted from the first stage DC-DC converter other than total voltage of the battery string. Since the each element in the DC-DC converter for each battery module has the voltage lowered at the first stage other than the voltage of the total batteries as an internal voltage by applying lower voltage to an input of the DC-DC converter for each battery module in the first stage DC-DC converter, the DC-DC converter for each battery module in the second stage can be advantageously designed as a low-capacity converter. Further, by classifying the battery string into M battery modules consisted of K batteries, it is possible to use the charge control switch of low voltage having only voltage of K batteries as the internal voltage, instead of the charge control switch having total voltage of the battery string as the internal voltage. Further, it is possible to selectively apply negative or positive output voltage (output voltage of the DC-DC converter in the second stage) to one current movement path formed in the charge control switch unit by the current conversion unit and thus considerably reduce the number of switch elements composing the charge control switch unit.

Figure 6:
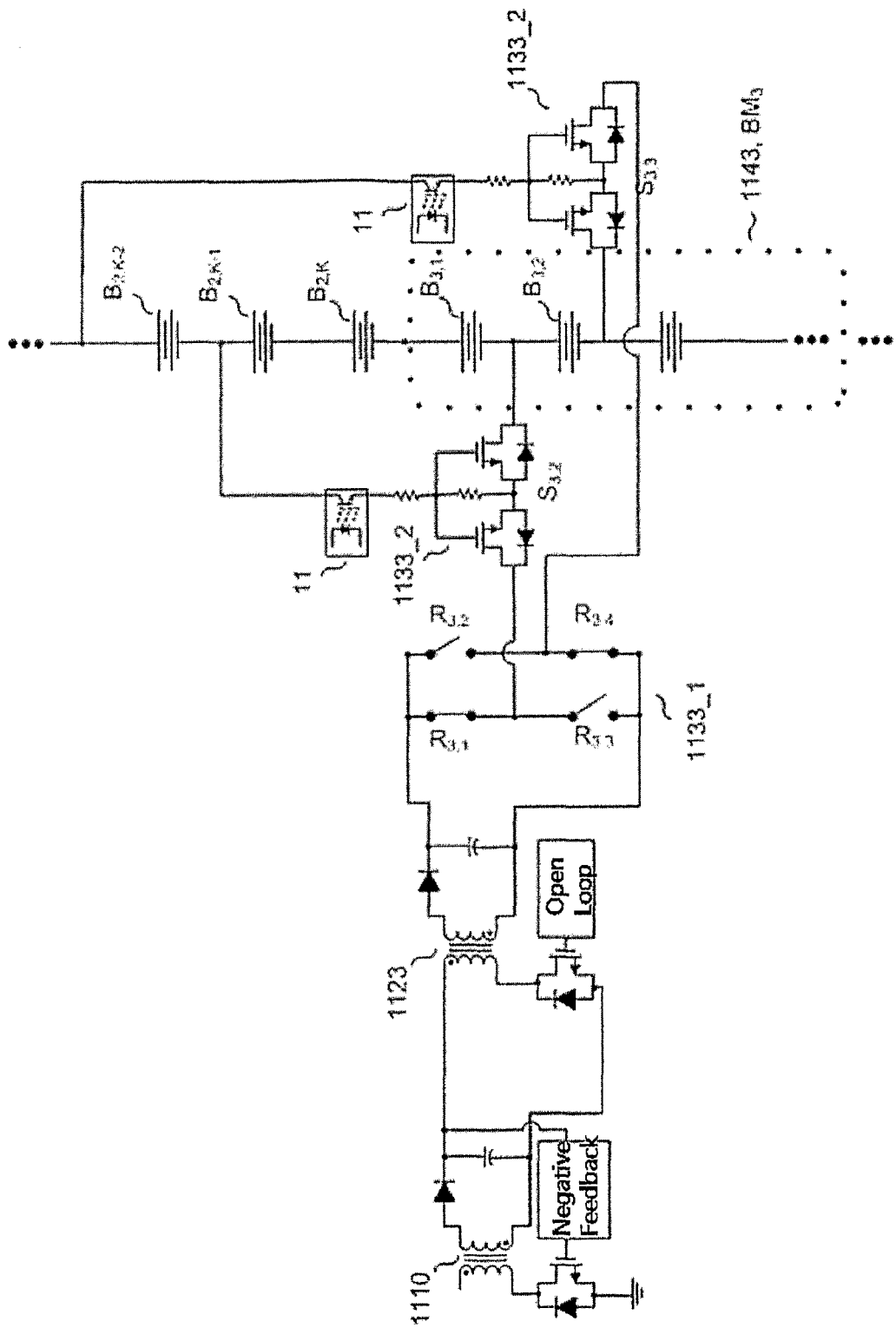
FIG. 6 is a partial circuit diagram of a two-stage charge equalization apparatus according to the present invention as a basis of other battery cell to be charged.

Referring to FIG. 5 and FIG. 6, it will be described on controlling a direction of the charge current in the current conversion unit 1133_1.

The current conversion unit 1133_1 controls and outputs the direction of the charge current differently according to the battery cell to be charged. If the first battery cell $B_{3,1}$ of the third battery module $BM_3$ 1143 is the battery cell to be charged, the direction of the charge current is controlled such that the switch $R_{3,2}$ and the switch $R_{3,3}$ are turned on in the current conversion unit 1133_1 of the third module and the bidirectional MOSFET switch $S_{3,1}$ and the bidirectional MOSFET switch $S_{3,2}$ are turned on in the charge control switch unit 1133_2 of the third module to cause the positive output and the negative output of the DC-DC converter 1123 to be applied to the current movement path $S_{3,1}$ and the current movement path $S_{3,2}$ which are formed in the charge control switch unit 1133_2 respectively, as shown in FIG. 5.

If the second battery cell $B_{3,2}$ of the third battery module $BM_3$ 1143 is the battery cell to be charged, the direction of the charge current is controlled such that the switch $R_{3,1}$ and the switch $R_{3,4}$ are turned on in the current conversion unit 1133_1 of the third module and the bidirectional MOSFET switch $S_{3,2}$ and the bidirectional MOSFET switch $S_{3,3}$ are turned on in the charge control switch unit 1133_2 of the third module to cause the positive output and the negative output of the DC-DC converter 1123 to be applied to the current movement path $S_{3,2}$ and the current movement path $S_{3,3}$ which are formed in the charge control switch unit 1133_2 respectively, as shown in FIG. 6.

Considering them as a generalized concept, if the battery cell composing the battery module is jth battery cell (j is an even number) in Mth battery module, the direction of the charge current is controlled such that the switch $R_{3,2}$ and the switch $R_{3,3}$ of the current conversion unit 1133_1 of Mth module are turned on and two bidirectional MOSFET switch $S_{3,j}$ and bidirectional MOSFET switch $S_{3,j+1}$ which are connected in parallel to both terminals of jth battery cell which is the battery cell to be charged of bidirectional MOSFET switches composing the charge control switch unit 1133_2 in Mth module are turned on to cause the positive output and the negative output of the DC-DC converter 1123 to be applied to the current movement path $S_{3,j}$ and the current movement path $S_{3,j+1}$ which are formed in the charge control switch unit 1133_2 respectively. Therefore, the flow direction of the charge current flowing in the same current movement path ($S_{3,2}$ in FIG. 5 and FIG. 6 as an example) depends on the battery cell to be charged.

If the battery cell composing the battery module is jth battery cell (j is an odd number) in Mth battery module, the direction of the charge current is controlled such that the switch $R_{3,1}$ and the switch $R_{3,4}$ of the current conversion unit 1133_1 of Mth module are turned on and two bidirectional MOSFET switch $S_{3,i}$ and bidirectional MOSFET switch $S_{3,i+1}$ which are connected in parallel to both terminals of ith battery cell which is the battery cell to be charged of bidirectional MOSFET switches composing the charge control switch unit 1133_2 in Mth module are turned on to cause the positive output and the negative output of the DC-DC converter 1123 to be applied to the current movement path $S_{3,i}$ and the current movement path $S_{3,i+1}$ which are formed in the charge control switch unit 1133_2 respectively.

Therefore, since a forward direction current or a reward direction current can be selectively applied on a single current movement path by the current conversion unit without a need for forming two current movement paths of positive direction and negative direction for each battery cell to be charged, it is possible to considerably reduce the number of switches composing the charge control switch unit.

Figure 7:
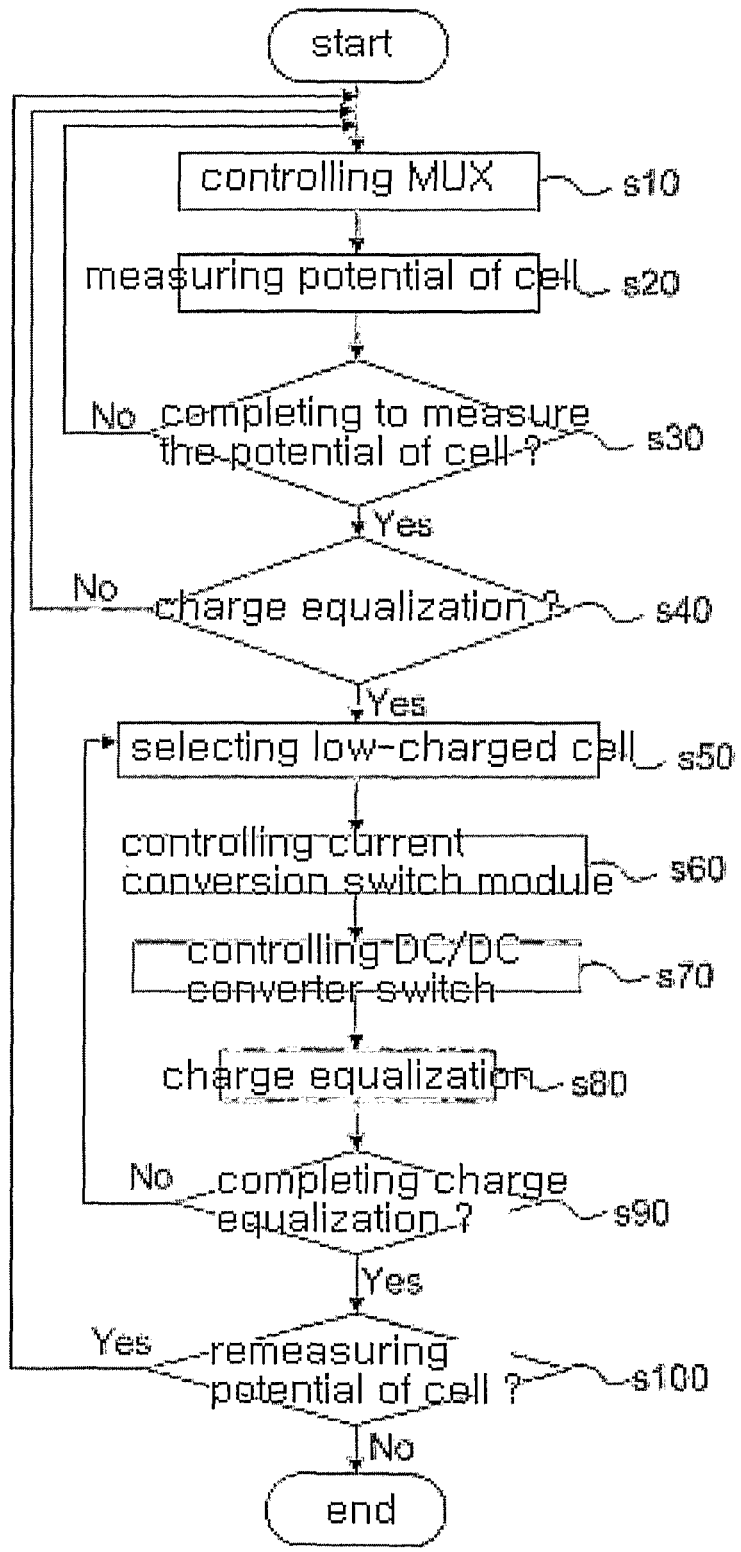
FIG. 7 is one flow diagram showing a two-stage charge equalization method according to the present invention.

Referring to FIG. 7, the charge equalization method according to the present invention will be described.

The two-stage charge equalization method for a series-connected battery string according to the present invention will be performed based on the charge equalization apparatus mentioned above.

Specifically, the charge equalization method is performed using the charge equalization apparatus comprising one or more battery module having a plurality of battery cells composing the battery string and connected in series a two-stage DC-DC converter; a first DC-DC converter which is inputted with a total voltage of the battery string and outputs a voltage lower than the voltage inputted; a second DC-DC converter which is inputted with an output of the first DC-DC converter and outputs a charge current for charging a particular battery cell; a current conversion switch module which forms a path of the charge current between the battery module and the second DC-DC converter to allow the charge current to be applied to the particular battery cell composing the battery module and controls an application direction of the charge current; a multiplexer which is inputted with a voltage of each battery cell composing the battery string; a voltage sensor which is connected to an output of the multiplexer to measure the voltage of each battery cell; and a microprocessor which determines a battery cell to be charged of a low-charged battery cell, controls the current conversion switch module to allow the charge current to be applied to the battery cell to be charged and controls on/off operation of the first DC/DC converter and the second DC/DC.

The two-stage charge equalization method for a series-connected battery string according to the present invention comprises steps of (a) determining whether to perform charge equalization of the battery string based on a voltage difference obtained by measuring a voltage of each battery cell composing the battery string (s10~S40); (b) selecting a low charged battery cell based on the voltage measured upon performing the charge equalization of the battery string (s50); (c) controlling directions of two negative and positive outputs of the second DC-DC converter to connect the low-charged battery cell and the two outputs of the second DC-DC converter in parallel (s60); (d) operating the second DC-DC converter (s80); and (e) charging the low-charge battery cell by operating the first DC-DC converter (s80).

Preferably, the step (a) is performed such that a voltage value of each battery cell composing the battery string obtained via the voltage sensor is inputted to the microprocessor by controlling the multiplexer (s10~s80), and charge equalization of the battery string is preferably performed if a difference in measurement voltage of the battery cell is higher than the certain value (s40). At this time, the step (a) can measure each voltage of all batteries composing the battery string, measure a voltage of partial battery composing the battery string, and measure a voltage of one or more battery module.

In the step (b, s50), the microprocessor determines the battery cell on which charge equalization of the battery string according to the present invention is performed, and preferably determines the low-charged battery cell as the battery cell to be charged.

The step (c, s60) controls such that two negative or positive outputs of the second DC-DC converter are selectively applied on the low-charged battery cell of a battery cell to be charged and the current movement path is formed between the low-charged battery cell and the two outputs of the second DC-DC converter.

Specifically, the charge control switch unit composing the current conversion switch module is controlled by the microprocessor to form a path of a low impedance through which two negative and positive outputs of the second DC-DC converter are applied and the current conversion unit composing the current conversion switch module is controlled such that the negative output of the second DC-DC converter is applied to the path of low impedance formed on a cathode of the low-charged battery cell and the positive output of the second DC-DC converter is applied to the path of low impedance formed on an anode of the low-charged battery cell. The current conversion switch module including the current conversion unit and the charge control switch unit is controlled by the microprocessor to set the current path and the application direction of the current so that the charge current outputted from the second DC/DC converter flows in the low-charged cell which is a battery cell to be charged.

The step (e) performs controlling such that the first DC-DC converter is interrupted (off) and a magnetic energy stored in the first DC-DC converter is moved to the second DC-DC converter to cause the second DC-DC converter to be operated (on) at a certain duty ratio.

Specifically, if the low-charged battery cell which is a battery cell to be charged is determined by the microprocessor, the current conversion switch module is inputted with a control signal of the microprocessor to set the current path between the low-charged battery cell and the second DC-DC converter and set the application direction of the current, and then the second DC-DC converter and the first DC-DC converter are successively operated (on) by the microprocessor. The first DC-DC converter is interrupted (off) and the magnetic energy stored on the first DC-DC converter is moved to the second DC-DC converter. At this time, the second DC-DC converter is inputted with a PWM signal generated by the microprocessor and operated (on) at a certain duty ratio to output the charge current. Such charge current flows in the low-charged battery cell to charge the battery cell in accordance with the current path formed by the current conversion switch module and the current application direction.

The first DC-DC converter is inputted with a total voltage of battery string and output the voltage lower than the inputted voltage and the input of the second DC-DC converter is connected in parallel to the output of the first DC-DC converter so that the low-charged battery cell is charged by the voltage of the total battery string inputted from the first DC-DC converter.

The charge equalization method can be accomplished such that the step (a) measures the voltage of each of all batteries composing the battery string and the steps (b) to (e) are performed independently of one another for each battery module composing the battery string and consisted of a plurality of battery cells connected in series. Therefore, the low-charged battery cell can be selected independently of one another for each battery module, and the low-charged battery cells selected for each battery module are charged independently of one another by the charge current of individual second DC-DC converter provided for each battery module. At this time, the current conversion switch module is provided for each battery module between the battery module and the second DC-DC converter and the current conversion switch module is controlled independently of one another for each module by the microprocessor.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A two-stage charge equalization apparatus for a battery string having two or more battery cells connected in series, comprising:

a two-stage DC-DC converter including a first DC-DC converter which is inputted with a total voltage of the battery string and outputs a voltage lower than the voltage inputted; and a second DC-DC converter which is inputted with an output of the first DC-DC converter and outputs a charge current for charging a particular battery cell, wherein the battery string is divided into one or more battery modules having a plurality of battery cells connected in series and the second DC-DC converter is provided for each battery module;

a current conversion switch module which forms a path of the charge current between the battery module and the second DC-DC converter to allow the charge current to be applied to the particular battery cell composing the battery module and controls an application direction of the charge current; and a microprocessor which determines a battery cell to be charged of a low-charged battery cell and controls the current conversion switch module to allow the charge current to be applied to the battery cell to be charged.

2. The two-stage charge equalization apparatus according to claim 1, wherein the current conversion switch module is provided for each battery module, and the current conversion switch module comprises a current conversion unit and a charge control switch unit which are connected to an output of the second DC-DC converter to control the application direction of the current.

3. The two-stage charge equalization apparatus according to claim 2, wherein the charge control switch unit is constructed with charge control switches of the same number as the number of the battery cells composing the battery module and is connected in parallel to each of the battery cells to form the current movement path between the current conversion unit and the battery module.

4. The two-stage charge equalization apparatus according to claim 3, wherein the current conversion unit is connected to two negative/positive outputs of the second DC-DC converter to selectively apply the negative or positive output on the current movement path formed by the charge control switch.

5. The two-stage charge equalization apparatus according to claim 3, wherein the charge control switch is a bidirectional Metal Oxide Semiconductor Field Effect Transistor (MOSFET) switch.

6. The two-stage charge equalization apparatus according to claim 5, wherein Vgs applied upon turning on the MOSFET composing the bidirectional MOSFET switch is a voltage of two or more series-connected batteries which is one part of the battery module.

7. The two-stage charge equalization apparatus according to claim 5, further comprising an electronic relay provided in a gate of the MOSFET composing the bidirectional MOSFET switch.

8. The two-stage charge equalization apparatus according to claim 7, wherein the electronic relay comprises a light-emitting diode and a light-receiving element, and the light-emitting diode is emitted under the control of the microprocessor for controlling the charge control switch unit.

9. The two-stage charge equalization apparatus according to claim 1, further comprising a multiplexer which is inputted with a voltage of each battery cell composing the battery string and a voltage sensor which is connected to an output of the multiplexer.

10. The two-stage charge equalization apparatus according to claim 9, wherein the multiplexer is controlled by the microprocessor and the voltage of each battery cell composing the battery string measured by the voltage sensor is inputted to the microprocessor.

11. The two-stage charge equalization apparatus according to claim 1, wherein the first DC-DC converter is a DC-DC converter with a negative feedback circuit.

12. The two-stage charge equalization apparatus according to claim 1, further comprising a switch element controlling on/off of each of the first DC-DC converter and the second DC-DC converter, wherein the switch element is controlled by the microprocessor.

13. The two-stage charge equalization apparatus according to claim 12, wherein the switch element is controlled by a pulse width modulation (PWM) signal generated by the microprocessor.

14. A two-stage charge equalization method for a series-connected battery string using the charge equalization apparatus according to claim 1, comprising steps of:
 (a) determining whether to perform charge equalization of the battery string based on a voltage difference obtained by measuring a voltage of each battery cell composing the battery string;
 (b) selecting a low charged battery cell based on the voltage measured if charge equalization of the battery string is performed;
 (c) controlling directions of two negative and positive outputs of the second DC-DC converter to connect the low-charged battery cell and the two outputs of the second DC-DC converter in parallel;
 (d) operating the second DC-DC converter; and
 (e) charging the low-charge battery cell by operating the first DC-DC converter.

15. The two-stage charge equalization method according to claim 14, wherein the step (c) performs controlling such that two negative or positive outputs of the second DC-DC converter are selectively applied on the low-charge battery cell and a current movement path is formed between the low-charged battery cell and the two outputs of the second DC-DC converter.

16. The two-stage charge equalization method according to claim 14, wherein the step (e) performs controlling such that the first DC-DC converter is interrupted (off) and a magnetic energy stored in the first DC-DC converter is moved to the second DC-DC converter to cause the second DC-DC converter to be operated (on) at a certain duty ratio.

17. The two-stage charge equalization method according to claim 14, wherein the charge equalization method measures a voltage of each of all batteries composing the battery string in the step (a), and
 the steps (b) to (e) are performed independently of one another for each battery module which composes the battery string and is consisted of a plurality of series-connected battery cells.

18. The two-stage charge equalization method according to claim 14, wherein to charge the low-charged battery cell in the step (e) is caused due to a total voltage of the battery string which is an input of the first DC-DC converter.

* * * * *